United States Patent
Bobda

(10) Patent No.: US 10,191,495 B2
(45) Date of Patent: Jan. 29, 2019

(54) DISTRIBUTED CEILING-MOUNTED SMART CAMERAS FOR MULTI-UNMANNED GROUND VEHICLE ROUTING AND COORDINATION

(71) Applicant: BOARD OF TRUSTEES OF THE UNIVERSITY OF ARKANSAS, Little Rock, AR (US)

(72) Inventor: Christophe Bobda, Fayetteville, AR (US)

(73) Assignee: Board Of Trustees Of The University Of Arkansas, Fayetteville, AR (US)

(*) Notice: Subject to any disclaimer, the term of this patent is extended or adjusted under 35 U.S.C. 154(b) by 25 days.

(21) Appl. No.: 15/383,825

(22) Filed: Dec. 19, 2016

(65) Prior Publication Data

US 2017/0176999 A1 Jun. 22, 2017

Related U.S. Application Data

(60) Provisional application No. 62/268,786, filed on Dec. 17, 2015.

(51) Int. Cl.
G05D 1/02 (2006.01)

(52) U.S. Cl.
CPC ... *G05D 1/0297* (2013.01); *G05D 2201/0216* (2013.01)

(58) Field of Classification Search
CPC .. G05D 1/0246; G05D 1/0088; G05D 1/0287; A01D 34/008; B25J 5/007; B60R 1/00; G01S 13/931
See application file for complete search history.

(56) References Cited

U.S. PATENT DOCUMENTS

| | | | | |
|---|---|---|---|---|
| 6,151,539 A * | 11/2000 | Bergholz | ............... | G01S 13/931 340/435 |
| 9,233,472 B2 * | 1/2016 | Angle | ................... | H04L 12/282 |
| 9,323,992 B2 * | 4/2016 | Stein | ......................... | B60R 1/00 |
| 9,375,847 B2 * | 6/2016 | Angle | ................... | H04L 12/282 |
| 9,802,322 B2 * | 10/2017 | Angle | ................... | H04L 12/282 |
| 9,874,873 B2 * | 1/2018 | Angle | ................... | H04L 12/282 |
| 2004/0093650 A1 * | 5/2004 | Martins | ..................... | B25J 5/007 180/167 |
| 2018/0035606 A1 * | 2/2018 | Burdoucci | ........... | A01D 34/008 |

OTHER PUBLICATIONS

Saptharishi et al., Distributed surveillance and reconnaissance using multiple autonomous ATVs: CyberScout, 2002, IEEE, p. 826-836 (Year: 2002).*
Zanardi et al., A framework for the study of interactions between robots, 1997, IEEE, p. 4297-4302 (Year: 1997).*
Pickering et al., 3D Global Virtual Teaming Environment, 2006, IEEE, p. 1-8 (Year: 2006).*

(Continued)

*Primary Examiner* — McDieunel Marc
(74) *Attorney, Agent, or Firm* — Keith A. Vogt; Vogt IP

(57) ABSTRACT

An autonomous guided vehicle system that provides decentralized coordination and real-time environmental changes in a workspace to a vehicle. The system includes distributed cameras positioned in predetermined locations. The cameras are adapted to communicate with other cameras to coordinate the movement of the vehicles from a source to a destination.

20 Claims, 2 Drawing Sheets

(56) References Cited

OTHER PUBLICATIONS

Miseikis et al., Multi 3D camera mapping for predictive and reflexive robot manipulator trajectory estimation, 2016, IEEE, p. 1-8 (Year: 2016).*
Wangsiripitak, In-building navigation system using a camera, 2013, IEEE, p. 35-40 (Year: 2013).*
Gadd et al., A framework for infrastructure-free warehouse navigation, 2015, IEEE, p. 3271-3278 (Year: 2015).*
Gilg et al., Landmark-oriented visual navigation of a mobile robot, 1993, IEEE, p. 257-262 (Year: 1993).*
Hada et al., Indoor navigation of multiple mobile robots in a dynamic environment using iGPS, 2002, IEEE, p. 2682-2688 (Year: 2002).*
KMH Systems; Seegrid Robotic Industrial Trucks—How it Works; https://www.youtube.com/watch?v=4gvSR4oY6WU; Dec. 16, 2016; US.
MWPVL International; Is Kiva Systems a Good Fit for Your Distribution Center? An Unbiased Distribution Consultant Evaluation; Feb. 2012; 17 pages; US.

\* cited by examiner

DISTRIBUTED CEILING-MOUNTED SMART CAMERAS FOR MULTI-UNMANNED GROUND VEHICLE ROUTING AND COORDINATION

RELATED APPLICATIONS

This application claims the benefit of U.S. Provisional Application No. 62/268,786, filed Dec. 17, 2015, and herein incorporated by reference.

STATEMENT REGARDING FEDERALLY SPONSORED RESEARCH & DEVELOPMENT

This invention was made with government support from the National Science Foundation, Award No. 1547934. The government has certain rights in the invention.

INCORPORATION BY REFERENCE OF MATERIAL SUBMITTED ON A COMPACT DISC

Not applicable.

BACKGROUND OF THE INVENTION

Autonomous Guided Vehicles (AGV) have the potential to revolutionize operations in areas such as manufacturing, distribution, transportation, and military. While AGVs can be used to move disabled people around in health-care and nursing facilities, the mundane and often repetitive task of transporting materials in manufacturing and distribution can be efficiently accomplished by using AGVs as well.

In material transport vehicles and systems, AGVs may include fork lift trucks, tuggers, and the like, which are used in a wide variety of applications. The recent successful introduction of robot systems in distribution centers and manufacturing to transport items around have shown the limitations of existing solutions. Disadvantages of current systems include being designed for only one fixed environment and/or addressing only a special case of potential navigation problems.

For instance, the Amazon Kiva robots require streets and highways mapped on the floor with barcode stickers and a central server to coordinate the robots. Even though the robots can detect obstacles such as humans and tipped pods and stop, the grid is intended only for navigation, which makes them less suitable in environments that are reconfigured by moving stations and objects around.

Furthermore, the space requirement for the navigation of hundreds of trucks in a production facility is very high compared to a system that does not require a dedicated track for navigation. Finally, Amazon's system makes sense only for newly acquired AGVs because of the application specific robots used. Users that already operate hundreds of AGVs cannot retrofit them for this solution.

Other approaches deploy robots that use spatial perception by stereoscopic vision and 3D evidence grids. In this approach, robots are first trained to recognized routes and build a map of the facility. Afterwards they can navigate from one point to the next using 3D collision avoidance. For these systems, any reconfiguration that changes a route requires new training which cannot be done in real-time, particularly for very large facilities.

One of the main impediments in current indoor AGV is path building and maintenance. In this regard, most systems rely so far on Simultaneous Localization and Mapping (SLAM), where robots are first trained to recognize routes and then try to build a map of the environment for navigation. In large facilities that are constantly reconfigured, the cost of map building and maintenance becomes too high, thus preventing the feasibility of this approach. SLAM for example is overcome in robots by using an interconnect structure build on the floor. While feasible in new facilities, the cost of retrofitting existing facilities with new robots are also too immense.

Representation of the environment is a prerequisite for coordination and navigation of AGV in an indoor facility. A dynamic 2D map of the facility can be maintained by computer vision algorithms in real-time, provided that whole pictures of the whole facilities are available to the algorithm whenever a change takes place in the environment. Change can be a complete reconfiguration of the facility, a human moving around, or objects lying in the way. Because a single camera cannot provide the entire view of a large facility, distributed cameras represent a straightforward way to collectively cover the complete facility. A distributed set of cameras such as those used in supermarkets can provide a partial view to a central server where the 2D reconstruction of the entire view can be done followed by the construction and dynamic update of the 2D map. The problem with this approach is the bandwidth required to transfer all the pictures to the central server as well as the amount of computing power the server must provide for large facilities. Furthermore, the whole navigation is compromised with potential fatal damages in case of central server failure.

Another system, which is already in use is patented by the Seegrid company. Their vision technology does not require environment modification. Their approach uses SLAM for creating a map of the environment. They are able to navigate from one point to the next one using a 3D collision avoidance. Facility reconfiguration with changes in routes requires a new training, which cannot be done in real-time particularly for very large facilities. The concept published by Reina, et al. has ceiling-mounted, or flying, cameras to monitor a whole area. Despite this, the setup of the robots is that they are not equipped with cameras and therefore do not navigate autonomously. Path planning and robot navigation is centralized at each camera, which tells the robots where to go. In a separate section, the authors use an "occupancy-map", where the area is divided in cells that can be marked if an object occupies them. Routing is done by using Voronoi-Diagrams for path computation. This method is not fully described, for example the size of the cells is not defined, which can vary from square centimeters to square meters. The number of cells to cover makes the method computational intractable, at least in real-time. Besides the computational burden of this approach, it is as stated earlier, difference in infrastructure and operation: No camera is used on the robot, which are not autonomous. Obstacle avoidance is performed by the cameras. With dozens of robots in a field-of-view (FoV), no camera can provide the computational power to tackle obstacle detection and avoidance and provide guidance to the robots in real-time.

A distributed network of cameras to control robots is also described in Y. Cheng. *Wireless mosaic eyes based robot path planning and control. Autonomous robot navigation using environment intelligence with distributed vision sensors.* PhD thesis, University of Bradford, 2010. The approach is similar to the previous one where cameras are still in charge of routing and navigation in their FoV. In an extension of this PhD-thesis, the author extends his method to include some low-level tasks to the robots such as low-level perception and control, which the robot needs anyway to move. It was not clear what the authors meant with low-level perception.

BRIEF SUMMARY OF THE INVENTION

In one embodiment, the present invention provides a system that provides decentralized coordination, real-time environmental changes, for use in many production facilities, and portability to other fields of application.

In other aspects, the present invention uses a set of distributed smart cameras in predetermined locations, such as on the ceiling of a facility or workspace, with overlapping fields-of-view for a global view and coordination at the operational level. Cameras may also be mounted on AGVs for short-range navigation. Multi-vehicle coordination is then framed as the problem of routing packets in a dynamic and hierarchical network where cameras represent routers and AGVs represent packets.

In yet other aspects, the present invention provides generic models, tools, and technologies that actively capture the working environments with semantically labeled objects, actions and events to generate goals, priorities, and plans.

In yet other aspects, the present invention automates the mundane tasks of transporting material around in distribution and manufacturing centers.

In yet other aspects, the present invention may be used to transport people autonomously in health care facilities, airports and in other settings.

In yet other aspects, the present invention permits existing trucks/vehicles to be easily retrofitted by adding the camera and communication systems besides the truck control.

In yet other aspects, the present invention provides autonomous cameras that can be installed in predetermined locations in various layouts without the need for wiretapping.

In one embodiment, the present invention provides a system and method that uses a representation of the environment in a mixture of hierarchical network and image understanding.

In yet other aspects, as opposed to robots that need to walk around and learn the environment, a very time-consuming process, the present invention provides a system that provides contextual maps to the AGVs in real-time.

In yet other aspects, the present invention provides a system that generates contextual maps through cameras mounted on the AGVs.

In yet other aspects, the present invention provides a system in which there is no need for the AGVs to undergo the time-consuming learning phase in response to changes in the environment since the contextual maps are automatically updated by the cameras.

In yet other aspects, the present invention provides a system that may be used in manufacturing and distribution companies, including lean and agile entities, which can optimize indoor transportation activities in an existing arrangement, without modification of available infrastructure, and reduce labor and operating costs by redeploying employees to value-added roles.

In yet other aspects, the present invention provides a system that will enable autonomous mobile robot applications in numerous other unstructured environments, including: hospitals, malls, retail stores, critical infrastructure, airports, schools, and sports venues.

In yet other aspects, the present invention provides a system for the guidance and coordination of autonomous ground vehicles in an indoor environment. The present invention may be based on a set of distributed ceiling-mounted smart cameras with overlapping field-of-view for global coordination. A mean shift based algorithm is implemented to extract a map of the environment. This map is used for a distributed routing of autonomous-guided-vehicles from source to destination. Shortest paths are calculated and updated in real-time. This embodiment of the present invention fits the requirements of decentralized coordination, real-time environmental changes, is the case in production facilities, and portability to other fields of application.

In yet other embodiments, the present invention uses a set of cameras distributed across the facility to collaboratively build and maintain a 2D navigation map. However, the processing will be done in situ, within the camera, which will communicate over a middleware-layer in a Wi-Fi-network with neighbors for global coordination of the AGV.

In other embodiments, the present invention provides a new method for vision based path construction and maintenance for indoor navigation of autonomous guided vehicles, based on collaborative smart cameras.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

Figure 1:
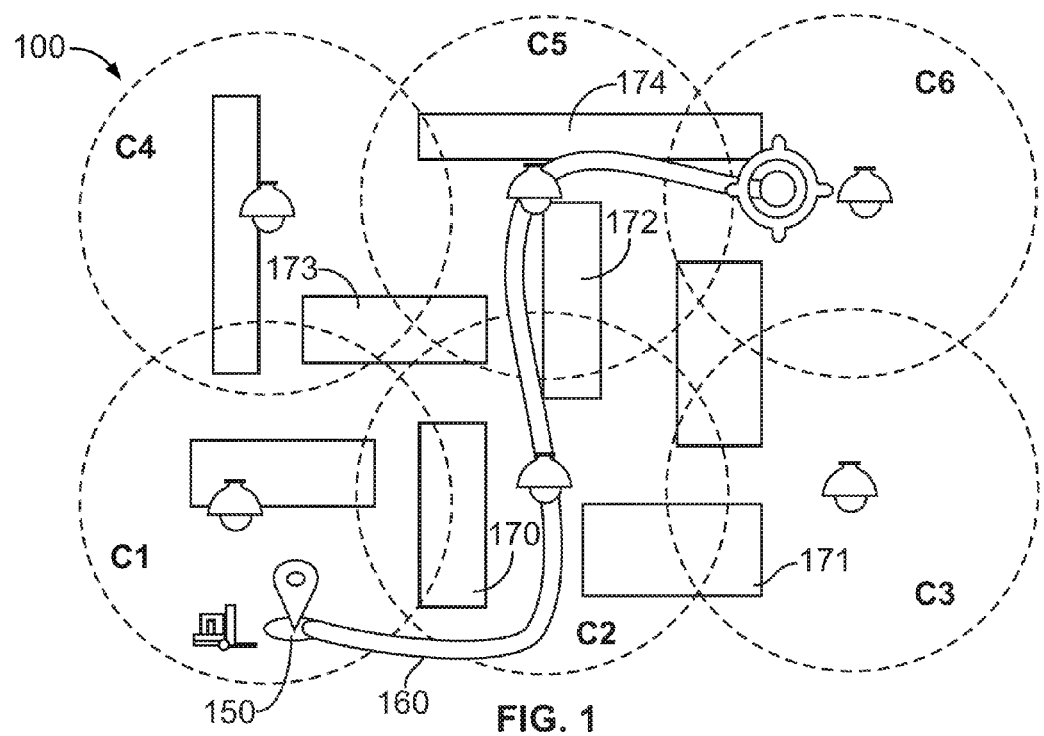
FIG. 1 illustrates a distributed coordination approach for one embodiment of the present invention, using a plurality of smart cameras with overlapping fields of view.
Figure 2A:
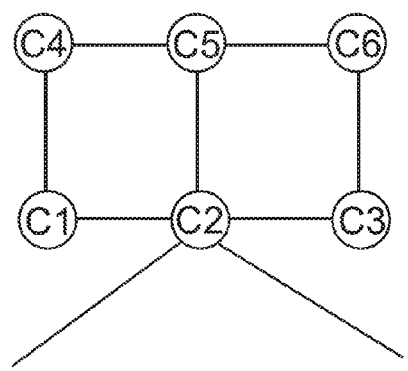
FIG. 2A illustrates a hierarchical graph that may be used as a data structure to capture the camera relationship at a first level of hierarchy for one embodiment of the present invention.

As shown in FIG. 1, for one embodiment of the present invention, environment 100 is covered by a set of smart cameras C1-C6 located in predetermined locations. The cameras are arranged to create overlapping fields of view as shown by the dashed circles in FIG. 1. For this arrangement, FIG. 2A provides a connection graph of the images captured by the cameras in which the cameras represent nodes and overlapping regions between two nodes define edges connecting them.

Figure 2B:
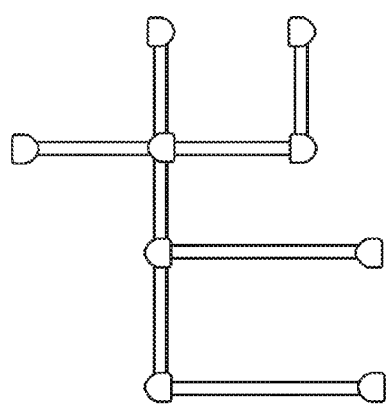
FIG. 2B illustrates a subgraph.

The low-level of hierarchy is defined within each graph node, which represents the field-of-view of a camera. At this level, navigation paths are represented in a subgraph consisting of a set of junction-points interconnected with direct edges as shown in FIG. 2B.

In system 100, the highest level connects the nodes to form the camera-relation graph. As shown in FIG. 1, truck 150 loaded in a zone covered by camera C1 is routed to a zone covered by camera C6 using path 160 that travels from the zones covered by C1→C2→C5→C6. Each camera is responsible to route the truck in the zone that it covers and to avoid obstructions 170-174. Accordingly, the present invention provides a collaborative, configurable and portable vision-based infrastructure for decentralized coordination of industrial AGVs in an environment or workspace.

In another embodiment, the present invention provides a system and method that provide decentralized coordination, real-time environmental changes, and portability to other fields of application. In a preferred embodiment, the present invention uses a set of distributed ceiling-mounted smart cameras with overlapping fields-of-view for global view and coordination at the facility level, and cameras mounted on AGVs for short-range truck navigation. Multi-truck coordination is then framed as the problem of routing packets in a dynamic and hierarchical network where cameras represent routers and AGVs represent packets.

In yet other embodiments, the present invention provides a representation of the environment to coordinate the navigation activities of AGVs in the working environment. This provides a flexible and portable infrastructure that is configured to update the scene representation of the working environment in the trucks in real-time without the need to relearn pathways.

In yet other embodiments, the present invention provides a dynamic 2D map of the working environment that may be maintained by computer vision algorithms in real-time, provided that whole picture of the facility is available to the algorithm whenever a change takes place in the environment. The change may be in the form of a complete reconfiguration of the facility, a human moving around, and objects lying in the way.

Since a single camera cannot provide the whole view of a large facility, distributed cameras represent a method to collectively cover a whole facility or a designated workspace. A distributed set of cameras, such as those used in supermarkets, can provide a partial view to a central server where the reconstruction of the entire view can be done followed by the construction and dynamic update of the 2D map. A drawback of this approach, however, is the bandwidth required to transfer all the pictures to the central server as well as the amount of computing power the server must be provided for large facilities. Furthermore, if the central server fails, the whole navigation is compromised with potential fatal damages.

To overcome, the above disadvantages, the present invention provides one or more cameras distributed across the facility to collaboratively build and maintain a 2D navigation map of the facility. However, the processing will be done in situ, within the cameras, which will communicate with other cameras in the system for global coordination of the AGVs.

In yet other embodiments, the present invention provides a control component with an interface that can be used by the computing module on the robots or vehicles for low-level navigation instructions. Upon loading a robot or vehicle, an operator provides the destination using a keypad or a remote-controlled input device. LCD-Displays on the robot or vehicle will be used to display specific information such as ID, destination, battery level. LCDs are more flexible than traditional fixed codes such as QR-Code and Barcodes. Different destinations and configurations can be displayed in different colors and sizes without a reprint of the codes. Ceiling-mounted cameras will then read this information to route the robots or vehicles to destination.

In a preferred embodiment, the cameras are arranged to achieve a global view of the facility that is dynamically captured by all cameras in a collaborative way. In the coverage zone of a camera, the pathways are maintained by that camera which coordinates the navigation in that area, in accordance with the routing objectives of the global network. A robot or vehicle entering a zone covered by a camera receives a navigation plan for that zone, with the goal of minimizing the total routing time to the global destination. When a path becomes obstructed by people or objects the responsible camera evaluates if re-routing is necessary (this will happen if a segment is so blocked that a robot or vehicle cannot pass, even with obstacle avoidance), computes a new path if necessary, and provides a new plan to the corresponding robots. Finally, collision avoidance at path intersections in a zone covered by a camera is solved by that camera, since it has a broader view compared to the involved robots or vehicles with only partial views.

In yet other aspects, the present invention provides for automatic path building and maintenance problem as well as the routing across cameras FoVs (field-of-views) in the following way: providing a plurality of ceiling-mounted cameras with overlapping FoVs for a gap-less coverage of the whole facility; the cameras may be pan-tilt-zoom, thus they can change their orientation for a better coverage in case of node failure; other cameras may be mounted on robots or vehicles for immediate obstacle avoidance, which in turn, reduces the processing load of any ceiling-mounted camera; using Middleware which provides a seamless and transparent infrastructure to organize share data in the whole network; using a central server, which will not be used for computation, but to provide configuration data, store global data structures, and if needed record videos and; providing a set of locations where a robot can stop for loading and unloading purpose.

In yet other embodiments, the present invention provides a camera system that combines the tasks for map extracting path building and global routing. The robots or vehicles receive the map if they enter the FoV of the camera. For real-time processing the camera system runs the image processing tasks in parallel as shown in FIG. 3.

Figure 3:
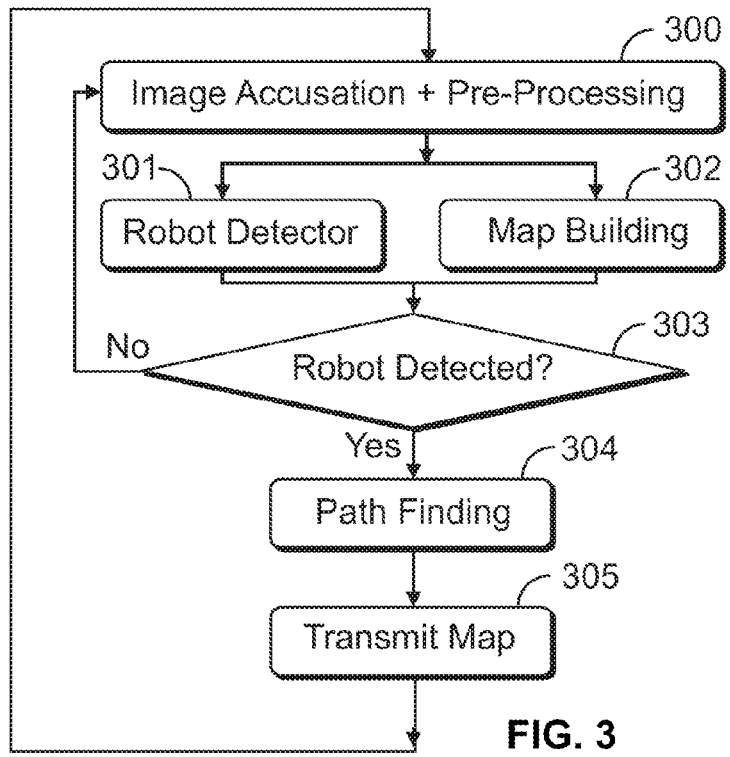
FIG. 3 illustrates the flow of a parallel tasks procedure.

As shown in FIG. 3, a camera may be configured to employ the following steps: step 300, image acquisition and preprocessing; step 301 robot or vehicle acquisition; step 302, map building; step 303, robot or vehicle detected?—If yes proceed to step 304 and if no go back to step 300; step 304, perform path finding, and; step 305 transmit map (which may be in the form of instructions) to robot or vehicle.

Map Extraction

In still further embodiments, map creation is accomplished by the present invention using multiple cameras. This arrangement offers advantages over more expensive solutions like laser beams for navigation. In a preferred embodiment, the present invention creates a model of the environment or workspace. Therefore, a goal of the present invention is to implement a fast map extracting algorithm to provide an "occupancy map" introduced for the robot or vehicle. To reach this, the 2D map of a facility using a set of smart cameras distributed across the facility dynamically produce and update the map. In preferred embodiments, the map is updated in real-time whenever changes occur in the environment. Because of this, the present invention implements an efficient way to do so based on mean shift color segmentation. The review about this algorithm is given as follows:

1) Color space: First, after receiving the RGB image from the camera the image is transformed into CIELUV color space. CIELUV is a uniform color space that helps to reduce the computational power and obtains a meaningful segmentation by its linear addition properties in images with additive mixtures of light. The chrominance components u and v depend on the lightness value L, which can be calculated by its luminance Y. The dependence of all three coordinates of the traditional RGB color values is nonlinear, which would increase the processing time of the algorithm by 300%.

2) Mean shift algorithm: In the second step, a mean shift color segmentation algorithm is undertaken which is introduced by D. Comaniciu et al. The authors undertake high quality edge preserving filtering and image segmentation, obtained by applying the mean shift in the d-dimensional Euclidean space $R^d$. D. Comaniciu and P. Meer defined a vector with the components of a color space. Therefore, the algorithm estimates from a point x, the density gradients over this color space with the kernel density gradients usually called as the Parzen window technique. Kernel density estimator for an arbitrary set of n points $x_i$, $i=1 \ldots n$, where the Kernel is $K(x)$ and the bandwidth parameter $h=(h_s,h_r)$ (Spatial-, Color-radius) is defined as:

$$\hat{f}(x) = \frac{1}{nh^d} \sum_{i=1}^{n} K\left(\frac{x - x_i}{h}\right) \quad (1)$$

The estimate of the density gradient is defined as the gradient of the kernel density estimate:

$$\hat{\nabla} f(x) \equiv \hat{f}(x) = \frac{1}{nh^d} \sum_{i=1}^{n} \nabla K\left(\frac{x - x_i}{h}\right) \quad (2)$$

If Eq. (2) is set to 0 and define $g(x) = -K'(x)$ the following is obtained:

$$m(x) = \frac{\sum_{i=1}^{n} g\left(\frac{x - x_i}{h}\right) x_i}{\sum_{i=1}^{n} g\left(\frac{x - x_i}{h}\right)} - x \quad (3)$$

Figure 4:
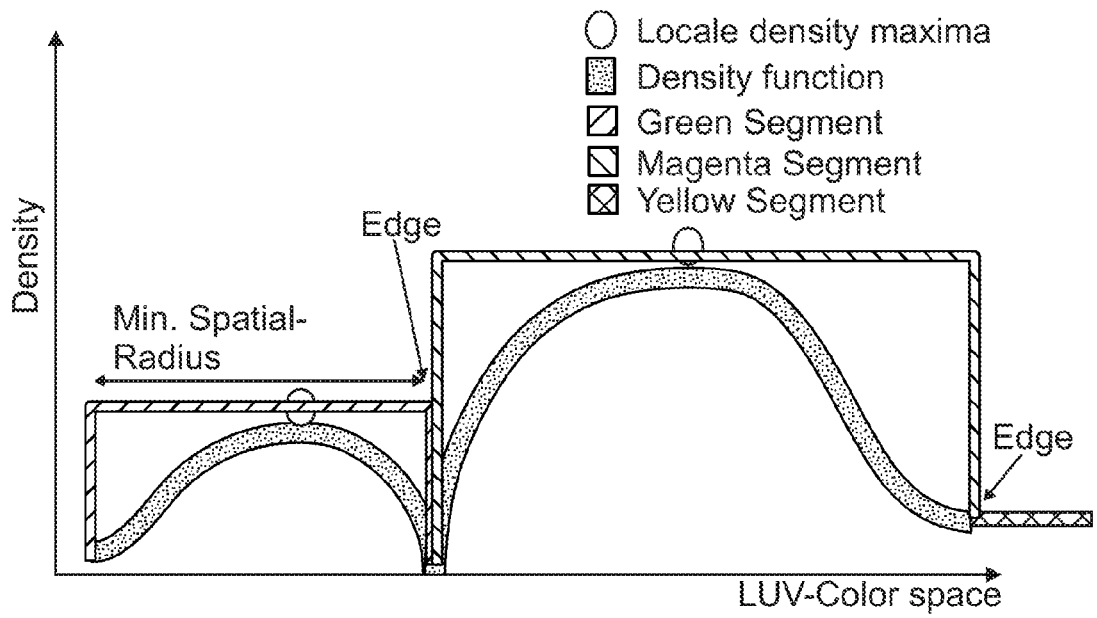
FIG. 4 depicts segmentation with a mean shift algorithm.

Eq. (3) is called the Mean-shift-vector, which always points toward the direction of maximum increase in density. This means that the local mean is shifted toward the region in which the majority of the points reside, which smooth the image to a certain value. As a result, clusters are obtained with the same density. However, the Mean Shift also takes into account the location of the pixels, which sharpens boundaries of color regions. Depending on the calibration of the camera and the given environment the bandwidth parameters $h_s$ and $h_r$ have to be setup at start-up of the system. After successful segmentation, every density segment is exchanged with a different random color. FIG. 4 shows a simple model how the color segmentation works:

3) Binary image: assuming that the floor constitutes the largest proportion of the segmented image, a histogram calculation can be used to determine the color value of the floor. An "occupancy map" is mostly defined with the numeric value one for obstacles and zero for space where the robot can operate. Therefore, the image is transferred into a binary image setting all color values of the floor to zero and everything else to one.

Path Building

A Map-Building-Based Navigation requires not only a 2D "occupancy map" but also a reliable map on how to navigate between the obstacles to reach, in the shortest way, a specific destination. Path-finding is a well discussed real-world problems. In various embodiments of the present invention, the following four common path searching algorithms may be used: A* algorithm; Dijkstra's algorithm; breath-first search algorithm and; wavefront algorithm.

The extended 4-connected pixel Von Neumann Neighborhood with a Manhattan distance of r=2 where used in the algorithms. Von Neumann used his neighborhood theory in the field of cellular automata and can be described on a given cell $(x_0,y_0)$ of a distance r by:

$$N^r_{(x_0,y_0)} = \{(x,y: |x-x_0| + |y-y_0| \leq r)\} \quad (4)$$

Eq. (4) defined on a square grid, consequences in a diamond-shape. The algorithms were evaluated in terms of costs and performance. For testing, an image with two different resolutions was used. Every algorithm had the same start and goal point. The algorithms were evaluated on an ARMv7 Cortex-A53, 1.2 GHz, rev 4 (v71) processor on gcc version 4.8.4-O3. The complexity/efficiency is expressed using the Bachmann-Landau notation, where $|V|$ is the number of vertices and $|E|$ is the number of edges in the graph.

TABLE 1

Comparison of path-finding algorithms.

| Algorithm | Complexity | Reso. | Costs | Time (ms) |
|---|---|---|---|---|
| A* algorithm | $\mathcal{O}(|E|)$ | 604 × 480 | 611 | 608 (±18.2) |
|  | $\mathcal{O}(|E|)$ | 320 × 240 | 305 | 58 (±1.7) |
| Wavefront | $\mathcal{O}(|E| + |V|)$ | 640 × 480 | 611 | 1778 (±53.3) |
|  | $\mathcal{O}(|E| + |V|)$ | 320 × 240 | 305 | 199 (±6.0) |
| BFS | $\mathcal{O}(|E| + |V|)$ | 640 × 480 | 611 | 1943 (±58.3) |
|  | $\mathcal{O}(|E| + |V|)$ | 320 × 240 | 305 | 212 (±6.4) |
| Dijkstra's | $\mathcal{O}(|E| + |V|\log|V|)$ | 640 × 480 | 611 | 4875 (±146.3) |
|  | $\mathcal{O}(|E| + |V|\log|V|)$ | 320 × 240 | 305 | 489 (±14.7) |

All algorithms found their goal with the same length/costs. Per contra the image size influence the execution time disproportionately high. The A*-algorithm is as expected the fastest. As it can be seen in Table 1, A* has the best time complexity. A* is admissible and takes into account fewer nodes than any other search algorithm with similar heuristic.

Global Routing

In yet other embodiments, the present invention provides a dynamic network. The network includes distributed cameras, which may be ceiling mounted, to dynamically capture a navigation path within a camera region, and the moving robots or vehicles. The network may be viewed as a 2-dimensional mesh topology wherein each node is identified by a 2-Tuple coordinate $(c_x,c_y)$. Because of possible changes in the network structure at run-time, the functions, set and variables used to capture the problem being solved by the present invention must explicitly be time dependent. At any time-stamp t, a ceiling-mounted camera is modeled relatively to its 4-connected Von Neumann Neighborhood explained in Eq. (4). Using atom $C^t(n, s, e, w)$, where $\{n, s, e, w\} \in N^+$ are variables indicating here the North-, South-, East-, and Westside neighbors. For example, atom $C^0$ (4, 0, 2, 0) expresses the fact that at system startup (t=0), the current camera is only connected to node 4 at north and to node 2 at east.

The navigation path within a camera's FoV is captured as a directed graph with nodes as junction points and edges representing single track segments. This graph may be called a navigation graph, one example of which is illustrated in FIG. 1. The navigation graph is captured using atoms P for nodes and E for edges. While $P_k^t$ represents a junction point k on the navigation graph, $E^t(k, l, c)$ is used for modeling the connection between two junction points k and 1 with a cost c at time t. The cost of an edge, connecting two junction points is equal to the edge traversal time which will increase at run-time proportionally to its use to avoid congestion and enhance a balance utilization of the paths within a camera region.

A robot j is captured using atom $T_t^j$ $(k, t_a, p, d_x, d_y)$, with k being the junction point at which the robot is located at time t, $t_a$ the arrival time at junction point k, p the priority attached to the delivery task, and $(d_x, d_y)$ the coordinate of the destination. The recognition process based on a common background (BG) subtraction task. It was decided that pixel vector $\vec{x}$ belongs to the background if $p(\vec{x}|X,BG) > c_{thr}$, where the threshold $c_{thr}$ was set to an empirical value of 24. In addition to this, their Gaussian mixture model was used with a training data set $X_T$ of 400 frames to get a background model defined by the first largest clusters B:

$$p(\vec{x}|\chi, BG) \sum_{m=1}^{B} \hat{\pi}_m \mathcal{N}(\vec{x}; \hat{\vec{\mu}}_m, \sigma_m^2 I) \quad (5)$$

$\vec{x}$ is denoted as the value of a pixel in a color space. $\vec{\mu}$ and $\sigma_m^2$ describe the Gaussian components estimation of mean and variance. The co-variance matrices are assumed to be diagonal and the identity matrix I has proper dimensions. The mixing weights denoted by $\hat{\pi}_m$.

As soon as the position of the robot is known, the inter-camera routing may start. The goal of inter-camera routing is to determine the next intermediate stop/hop of a moving robot j based on its final destination. Due to its simplicity, a XY-routing algorithm is leveraged for implementing point-to-point camera exchange in a 2-Dimension mesh topology network. In this algorithm, a packet is first routed on the X-axis until horizontal alignment and then vertically until it reaches its final destination. Whenever a new robot is captured at the entry point of a camera in the distributed system, its final destination $(d_x, d_y)$ will be compared to a camera address $(c_x, c_y)$. If both addresses match, then the robot will be considered as delivered. Otherwise, the horizontal coordinates ($c_x$ and $d_x$) will first be compared and the robot will be routed to the east if $c_x < d_x$ or to the west if $c_x > d_x$ until horizontal alignment ($c_x = d_x$).

A prerequisite for a reliable routing is that every camera is calibrated and knows its exact position relative to the other cameras. A middleware is implemented for Wi-Fi communication, independent of the underlying hardware. This connection makes use of TCP/IP-sockets to send the navigation data to the robot as well as their surrounding cameras. The robot translates the commands into movement orders, accessing the motors.

Table 2 provides performance analysis. The view of a camera is divided into six overlapping dynamic scenes as illustrated in FIG. 1, simulating a distributed camera network. In a test-case the robot gets detected via his unique ID by camera C3 and the tracked coordinates, gets the initial starting point for the path planning: A map of the given environment is already calculated when the Robot enters the FoV. Based on the given map and the tracked coordinates the camera computes necessary steps to send the robot to the next camera. In the following step, a path from the robot's entry point to the exit point toward the chosen camera nodes is forwarded to the robot. This is possible because the camera is aware of its position relative to the other cameras and uses regular dimension-ordering (XY-Routing). On the robot, there is a TCP/IP-Server listening to receive the navigation and orientation information. Once the robot receives the information, it translates the map into motor commands and continues along its way. Using this path planning combined with its camera for immediate obstacle avoidance the robot is able to navigate autonomously to a predetermined destination.

At last knowing the next destination of a robot and the entry and exit points within the monitoring camera region, the robot drives to the exit, which applies to the minimized time-to-destination-cost path C3→C6→C5.

TABLE 2

Timing analysis of the system on architecture 3.2 with an image resolution of 320 × 240.

| Task | Time (ms) | In parallel |
|---|---|---|
| Grab image + preprocessing | 107 (±3.2) | NO |
| Robot detector | 40 (±1.2) | YES |
| Map building + Path finding | 1386 (±41.6) | YES |
| Transmit Map | 0.3 (±0.01) | NO |
| Total | 1493 (±2.1) | — |

In another embodiment, the present invention provides an autonomous guided vehicle system that provides decentralized coordination and real-time environmental changes in a workspace. The embodiment includes a plurality of distributed cameras positioned in predetermined locations, each of the cameras having a field-of-view that covers a predetermined zone of the workspace and the cameras may be arranged to create overlapping fields-of-view of the workspace. The cameras communicate with a plurality of guided vehicles. The distributed cameras may be adapted to collaboratively build and maintain a navigation map (which may be a set of operation instructions) of the workspace which instruct the vehicle on how to travel along a path in the zone. The overlapping fields may be configured to provide gapless coverage of the workspace. The cameras are further adapted to communicate with other cameras to coordinate the movement of the vehicles from a source to a destination along a path. The system of the embodiment may also be adapted to provide a navigation map to a vehicle in real-time. The navigation map may also be automatically updated by one or more of the cameras and include stationary and/or moving obstacles.

A navigation map may be provided to a vehicle entering a predetermined zone covered by the camera for that zone. The navigation map may minimize total routing time through the zone. The camera may provide revised one or more navigation maps to a vehicle in the zone covered by the camera to reroute the vehicle around an obstacle that was not present in the zone or navigation map provided to the vehicle when the vehicle entered the zone.

In other aspects, the present invention provides a method for autonomously guiding a plurality of vehicles from a source to a destination along a path in a workspace comprising the steps of: providing a plurality of distributed cameras positioned in predetermined locations, each of the cameras having a field-of-view that covers a predetermined zone of the workspace and the cameras arranged to create overlapping fields-of-view of the workspace; providing a plurality of guided vehicles, the vehicles in communication with the distributed cameras; the distributed cameras adapted to collaboratively build and maintain at least one navigation map of the workspace, the at least one navigation map is already calculated when a vehicle enters the field-of-view of a camera and upon entering the field-of-view of a camera, the camera transmits a navigation map to the vehicle; and the transmitting camera computes the necessary steps in a navigation map to send the vehicle to the next camera or destination. In other embodiments, the present invention is adapted so that when a vehicle receives a navigation map, it translates the map into motor commands. In addition, a segmentation algorithm may be implemented to create one or more navigation maps of the workspace. In the method, wherein when a path becomes obstructed in a zone, the camera covering the zone provides a new navigation map to a vehicle.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An autonomous guided vehicle system that provides decentralized coordination and real-time environmental changes in a workspace comprising:
   a plurality of distributed cameras positioned in predetermined locations, each of said cameras having a field-of-view that covers a predetermined zone of the workspace and said cameras arranged to create overlapping fields-of-view of the workspace;
   a plurality of guided vehicles, said vehicles in communication with said distributed cameras;
   said distributed cameras adapted to collaboratively build and maintain a navigation map of the workspace; and
   said cameras adapted to communicate with other cameras to coordinate the movement of said vehicles from a source to a destination.

2. The system of claim 1 wherein said cameras are located above said vehicles and are adapted to know the positions of the other cameras.

3. The system of claim 2 wherein each vehicle has at least one camera for short range navigation and collision avoidance.

4. The system of claim 2 wherein the system provides a navigation map to a vehicle in real-time.

5. The system of claim 4 wherein said navigation map is automatically updated by one or more of said cameras.

6. The system of claim 5 wherein said navigation map includes stationary and moving obstacles.

7. The system of claim 2 adapted to provide a navigation map to a vehicle entering a predetermined zone covered by said camera for that zone.

8. The system of claim 7 wherein said navigation map minimizes total routing time through said zone.

9. The system of claim 8 wherein said camera provides a revised navigation map to a vehicle in the zone covered by the camera to reroute the vehicle around an obstacle that was not present in the navigation map provided to the vehicle when the vehicle entered the zone.

10. The system of claim 2 wherein said cameras are adapted to update a navigation map in real-time whenever a change occurs in the workspace.

11. The system of claim 2 wherein said camera provides collision avoidance instructions to a vehicle at path intersections in the zone.

12. A method for autonomously guiding a plurality of vehicles from a source to a destination along a path in a workspace comprising the steps of:
   providing a plurality of distributed cameras positioned in predetermined locations, each of said cameras having a field-of-view that covers a predetermined zone of the workspace and said cameras arranged to create overlapping fields-of-view of the workspace;
   providing a plurality of guided vehicles, said vehicles in communication with said distributed cameras;
   said distributed cameras adapted to collaboratively build and maintain at least one navigation map of the workspace, said at least one navigation map is already calculated when a vehicle enters the field-of-view of a camera and upon entering the field-of-view of a camera, the camera transmits a navigation map to said vehicle; and
   said transmitting camera computes the necessary steps in a navigation map to send the vehicle to the next camera or destination.

13. The method of claim 12 wherein when a vehicle receives a navigation map, it translates the map into motor commands.

14. The method of claim 12 wherein said cameras knows its position relative to the other cameras.

15. The method of claim 12 wherein a segmentation algorithm is implemented to create a navigation map of the workspace.

16. The method of claim 15 wherein shortest paths are calculated and updated in real-time.

17. The method of claim 15 wherein said cameras are distributed across the workspace to collaboratively build and maintain a navigation map.

18. The method of claim 15 wherein the overlapping fields provide gapless coverage of the workspace.

19. The method of claim 15 wherein cameras represent routers and vehicles represent packets.

20. The method of claim 15 wherein when a path becomes obstructed in a zone, the camera covering the zone provides a new navigation map to a vehicle.

* * * * *